United States Patent
Shim et al.

(10) Patent No.: US 9,098,132 B2
(45) Date of Patent: Aug. 4, 2015

(54) LINE ON GLASS TYPE LIQUID CRYSTAL DISPLAY DEVICE AND METHOD OF FABRICATING THE SAME

(71) Applicant: LG DISPLAY CO., LTD., Seoul (KR)

(72) Inventors: YuRi Shim, Gumi (KR); SungIl Park, Daegu (KR); SungGu Kang, Gumi (KR)

(73) Assignee: LG DISPLAY CO., LTD., Seoul (KR)

( * ) Notice: Subject to any disclaimer, the term of this patent is extended or adjusted under 35 U.S.C. 154(b) by 226 days.

(21) Appl. No.: 13/710,029

(22) Filed: Dec. 10, 2012

(65) Prior Publication Data

US 2013/0257841 A1    Oct. 3, 2013

(30) Foreign Application Priority Data

Mar. 29, 2012  (KR) .................. 10-2012-0032600

(51) Int. Cl.
| | |
|---|---|
| G06F 3/00 | (2006.01) |
| G06F 3/038 | (2013.01) |
| H01J 9/18 | (2006.01) |
| G02F 1/1345 | (2006.01) |

(52) U.S. Cl.
CPC .............. *G06F 3/038* (2013.01); *G02F 1/1345* (2013.01); *G02F 1/13454* (2013.01); *H01J 9/18* (2013.01); *G02F 2001/13456* (2013.01)

(58) Field of Classification Search
CPC ........................................................ G06F 3/038

USPC .......................................... 345/100; 349/152
See application file for complete search history.

(56) References Cited

U.S. PATENT DOCUMENTS

| | | | |
|---|---|---|---|
| 2002/0113934 A1 | 8/2002 | Aoki | |
| 2003/0128326 A1* | 7/2003 | Yamaguchi et al. | 349/152 |
| 2006/0290646 A1* | 12/2006 | Kang | 345/100 |
| 2011/0134102 A1 | 6/2011 | Lee | |

FOREIGN PATENT DOCUMENTS

| | | |
|---|---|---|
| CN | 1892786 A | 1/2007 |
| CN | 102087433 A | 6/2011 |
| JP | 2003-255381 A | 9/2003 |
| JP | 2011-164656 A | 8/2011 |
| TW | 1300496 B | 9/2008 |
| WO | WO 01/96823 A1 | 12/2001 |

* cited by examiner

*Primary Examiner* — Amare Mengistu
*Assistant Examiner* — Joseph G Rodriguez
(74) *Attorney, Agent, or Firm* — Birch, Stewart, Kolasch & Birch, LLP

(57) ABSTRACT

In a Line On Glass (LOG) type Liquid Crystal Display (LCD) device and a method of fabricating the same, LOGs and Outer Lead Bonding (OLB) lines are designed in a parallel structure, and a structure of contact holes within Flexible Printed Circuit (FPC) pads and bumpers of Integrated Circuits (ICs) changes, so as to prevent a broken fault due to corrosion and scratch, resulting in improvement of quality of an image displayed on the LCD device.

20 Claims, 13 Drawing Sheets

151

152   151

LINE ON GLASS TYPE LIQUID CRYSTAL DISPLAY DEVICE AND METHOD OF FABRICATING THE SAME

CROSS-REFERENCE TO RELATED APPLICATION

This application claims the benefit of Korean Patent Application No. 10-2012-0032600, filed on Mar. 29, 2012, which is hereby incorporated by reference for all purposes as if fully set forth herein.

BACKGROUND OF THE INVENTION

1. Field of the Invention

This specification relates to a liquid crystal display device, and more particularly, to a Line On Glass (LOG) type liquid crystal display device.

2. Related art of the Invention

A Liquid Crystal Display (LCD) device is a display device which is capable of displaying a desired image by supplying data signals responsive to image information to individual pixels having a matrix arrangement and adjusting light transmittance of such pixels.

The LCD device includes a Liquid Crystal (LC) panel having pixels arranged in the form of a matrix, a backlight disposed below the LC panel to emit light, and a driving unit located at an outer periphery of the LC panel to drive the pixels.

The LC panel includes a Thin Film Transistor (TFT) array substrate and a color filter substrate bonded to each other to face each other so as to maintain a cell gap therebetween, and an LC layer located within the cell gap between the TFT array substrate and the color filter substrate.

Here, the LC panel having the array substrate and the color filter substrate bonded to each other includes a common electrode and a pixel electrode so as to apply a magnetic field to the LC layer.

Hence, when a voltage of a data signal applied to the pixel electrode is controlled after a voltage is applied to the common electrode, liquid crystal molecules of the LC panel rotate by a dielectric anisotropy according to the magnetic field between the common electrode and the pixel electrode, so as to transmit or block light for each pixel, thereby representing text or image.

The driving unit includes driving Integrated Circuits (ICs) for applying a gate signal and a data signal to the LC panel. The LCD devices are divided, according to a method of packaging the driving ICs on the LC panel, into a Chip On Glass (COG) type, a Tape Carrier Packet (TCP) type, a Chip On Film (COF) type, and the like.

Among others, the COG type is to adhere the driving IC directly onto the array substrate of the LCD device and connect an output electrode of the driving IC directly to a line pad of the array substrate. The COG type has a simple structure, and accordingly is advantageous in view of a simplified process and a low fabrication cost.

The COG type LCD device is requiring for a method of reducing a resistance of a line of the driving unit, and also a method of maintaining a function of the line of the driving unit against corrosion and external scratches. That is, the line of the driving unit is a core element for driving a screen of the LCD device but exposed to an external environment, which causes a broken fault due to corrosion and external scratches.

SUMMARY OF THE INVENTION

Therefore, to address the problem, an aspect of the detailed description is to provide a Line On Glass (LOG) type LCD device capable of lowering a resistance of a line of a driving unit, and a method of fabricating the same.

Another aspect of the detailed description is to provide an LOG type LCD device capable of preventing a broken fault of a line of a driving unit due to corrosion and scratches, and a method of fabricating the same.

To achieve these and other advantages and in accordance with the purpose of this specification, as embodied and broadly described herein, there is provided a Line On Glass (LOG) type liquid crystal display device including a liquid crystal panel divided into a display region and a non-display region, and having a plurality of data lines and gate lines intersecting with each other on the display region so as to define a plurality of pixel regions; a printed circuit board having a timing controller, which receives synchronization signals and image data to output a plurality of control signals and image data for driving the liquid crystal panel; a Flexible Printed Circuit (FPC) configured to electrically connect the printed circuit board to external circuits; a plurality of gate driving Integrated Circuits (ICs) configured to receive the plurality of control signals and driving voltages to sequentially apply driving signals of the thin film transistors to the plurality of gate lines, and a plurality of data driving integrated circuits configured to receive the plurality of control signals and image data and the driving voltages to drive the plurality of data lines, the plurality of gate driving integrated circuits and data driving integrated circuits being packaged onto the non-display region; and a plurality of Outer Lead Bonding (OLB) lines and Line On Glasses (LOGs) employed for connection between the flexible printed circuit and the data driving integrated circuits and between the flexible printed circuit and the gate driving integrated circuits, and implemented as a dual line that a data conductive layer is deposited on a gate conductive layer.

In one aspect, there is provided a plurality of flexible printed circuit pads formed within the flexible printed circuit and configured to electrically connect the gate conductive layer and the data conductive layer of the outer lead bonding line or the line on glass, and each of the flexible printed circuit pads may include a lower electrode of a flexible printed circuit pad formed as the gate conductive layer on a first substrate, a gate insulating layer formed on the first substrate having the lower electrode of the flexible printed circuit pad, a first etch stopper formed on the gate insulating layer to overlap the lower electrode of the flexible printed circuit pad, an upper electrode of a flexible printed circuit pad formed as the data conductive layer to shield the first etch stopper, a passivation layer formed on the first substrate having the upper electrode of the flexible printed circuit pad, and a flexible printed circuit pad electrode electrically connected to the lower electrode and the upper electrode of the flexible printed circuit pad via a plurality of first contact holes and second contact holes formed at the passivation layer.

In another aspect, there is provided a plurality of input bumpers formed in the data driving integrated circuits and the gate driving integrated circuits, respectively, and configured to electrically connect the gate conductive layer and the data conductive layer of the outer lead bonding line or the line on glass, and each of the input bumpers may include a lower electrode of an input bumper formed as the gate conductive layer on the first substrate, the gate insulating layer formed on the lower electrode of the input bumper, a second etch stopper formed on the gate insulating layer to overlap the lower electrode of the input bumper, an upper electrode of an input bumper formed as the data conductive layer to shield the second etch stopper, the passivation layer formed on the upper electrode of the input bumper, and an input bumper electrode electrically connected to the lower electrode and the upper electrode of the input bumper via a plurality of third contact holes and fourth contact holes formed at the passivation layer.

In another aspect, the outer line bonding lines may include a first outer lead bonding line formed as the gate conductive layer and a second outer lead bonding line formed as the gate conductive layer on the first outer lead bonding line, and the line on glasses may include a first line on glass formed as the gate conductive layer and a second line on glass formed as the data conductive layer on the first line on glass.

In another aspect, the first outer lead bonding line and the second outer lead bonding line may be electrically connected to each other via the first contact hole and the second contact hole within the flexible printed circuit pad, and via the third contact hole and the fourth contact hole within the input bumper of the data driving integrated circuit.

In another aspect, the first line on glass and the second line on glass may be electrically connected to each other via the first contact hole and the second contact hole within the flexible printed circuit pad, and via the third contact hole and the fourth contact hole within the input bumper of the gate driving integrated circuit.

In another aspect, the first contact hole, the second contact hole, the third contact hole and the fourth contact hole may be arranged in a zigzag manner at right and left sides on the flexible printed circuit pad or the input bumper.

In another aspect, when the first contact hole and the third contact hole are arranged at a left side, the second contact hole and the fourth contact hole may be arranged at a right side, and when the first contact hole and the third contact hole are arranged at a right side, the second contact hole and the fourth contact hole may be arranged at a left side.

In another aspect, the gate conductive layer may be made of an aluminum-based conductive material consisting of aluminum or aluminum alloy, and the data conductive layer may be made of a molybdenum-based conductive material consisting of molybdenum or molybdenum alloy.

To achieve these and other advantages and in accordance with the purpose of this specification, as embodied and broadly described herein, there is provided a method for fabricating a Line On Glass (LOG) type liquid crystal display device including preparing a first substrate divided into a display region and a non-display region; forming a gate electrode and a gate line on the display region of the first substrate, and forming a lower electrode of a flexible printed circuit pad, a lower electrode of an input bumper, a first Outer Lead Bonding (OLB) line and a first Line On Glass (LOG) on the non-display region of the first substrate; forming a gate insulating layer on the first substrate having thereon the gate electrode, the gate line, the lower electrode of the flexible printed circuit pad, the lower electrode of the input bumper, the first outer lead bonding line and the first line on glass; forming an active pattern on the gate electrode having the gate insulating layer thereon; forming a pixel electrode on a pixel region of the first substrate and forming a first etch stopper and a second etch stopper on the lower electrode of the flexible printed circuit pad and the lower electrode of the input bumper, respectively; forming a source electrode, a drain electrode and a data line on the display region of the first substrate having the active pattern thereon, and forming an upper electrode of the flexible printed circuit pad, an upper electrode of the input bumper, a second outer lead bonding line and a second line on glass on the lower electrode of the flexible printed circuit pad, the lower electrode of the input bumper, the first outer lead bonding line and the first line on glass, respectively.

In one aspect, there is further provided a step of forming a passivation layer on the first substrate having thereon the source electrode, the drain electrode, the data line, the upper electrode of the flexible printed circuit pad, the upper electrode of the input bumper, the second outer lead bonding line and the second line on glass; selectively removing the gate insulating layer, the upper electrode of the flexible printed circuit pad, the upper electrode of the input bumper and the passivation layer to form a first contact hole, a second contact hole, a third contact hole and a fourth contact hole at the non-display region of the first substrate so as to partially expose the lower electrode of the flexible printed circuit pad, the first etch stopper, the lower electrode of the input bumper and the second etch stopper, respectively; forming a common electrode having a plurality of slits within the pixel region of the display region of the first substrate, forming a flexible printed circuit pad electrode on the non-display region of the first substrate to be electrically connected to the lower electrode and the upper electrode of the flexible printed circuit pad via the first contact hole and the second contact hole, respectively, and forming an input bumper electrode to be electrically connected to the lower electrode and the upper electrode of the input bumper via the third contact hole and the fourth contact hole, respectively; and bonding the first substrate to a second substrate.

In another aspect, the first outer lead bonding line may extend toward the flexible printed circuit to be connected to the lower electrode of the flexible printed circuit pad and simultaneously extend toward a data driving integrated circuit to be connected to the lower electrode of the input bumper. Also, the first line on glass may extend toward the flexible printed circuit to be connected to the lower electrode of the flexible printed circuit pad and simultaneously extend toward a gate driving integrated circuit to be connected to the lower electrode of the input bumper.

In another aspect, the first and second etch stoppers may be formed in a zigzag manner at right and left sides on the lower electrode of the flexible printed circuit pad and the lower electrode of the input bumper.

In another aspect, the upper electrode of the flexible printed circuit pad and the upper electrode of the input bumper may be formed so as to expose in a zigzag manner right and left sides of the lower electrode of the flexible printed circuit pad and the lower electrode of the input bumper located therebelow, respectively.

In another aspect, the upper electrode of the flexible printed circuit pad and the upper electrode of the input bumper may be formed to shield the first etch stopper and the second etch stopper located therebelow, respectively.

In another aspect, the second outer lead bonding line may extend toward the flexible printed circuit to be connected to the upper electrode of the flexible printed circuit pad and simultaneously extend toward a data driving integrated circuit to be connected to the upper electrode of the input bumper. Also, the second line on glass may extend toward the flexible printed circuit to be connected to the upper electrode of the flexible printed circuit pad and simultaneously extend toward a gate driving integrated circuit to be connected to the upper electrode of the input bumper.

In another aspect, the second contact hole and the fourth contact hole may expose side surfaces of the upper electrode of the flexible printed circuit pad and the upper electrode of the input bumper, respectively, as well as surfaces of the first and second etch stoppers.

In another aspect, the first contact hole, the second contact hole, the third contact hole and the fourth contact hole may be arranged in a zigzag manner within the flexible printed circuit or the input bumper.

In another aspect, the lower electrode of the flexible printed circuit pad, the lower electrode of the input bumper, the first outer lead bonding line and the first line on glass may be formed of an aluminum-based conductive material consisting of aluminum or aluminum alloy.

In another aspect, the pixel electrode, the common electrode, the first and second etch stoppers, the flexible printed circuit pad electrode and the input bumper electrode may be made of a transparent conductive material including Indium Tim Oxide (ITO) or Indium Zinc Oxide (IZO).

In another aspect, the source electrode, the drain electrode, the upper electrode of the flexible printed circuit pad, the upper electrode of the input bumper, the second outer lead bonding line and a second line on glass may be made of a molybdenum-based conductive material consisting of molybdenum or molybdenum alloy.

In accordance with a Line On Glass (LOG) type Liquid Crystal Display (LCD) device and a method of fabricating the same, LOGs and Outer Lead Bonding (OLB) lines are designed in a parallel structure, and a structure of contact holes within Flexible Printed Circuit (FPC) pads and input bumpers of data driving Integrated Circuits (ICs) changes, so as to prevent a broken fault due to corrosion and scratch, resulting in improvement of quality of an image displayed on the LCD device.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, description will be given in detail of an LOG type LCD device and a method of fabricating the same in accordance with the exemplary embodiments of the present disclosure with reference to the accompanying drawings.

Figure 1:
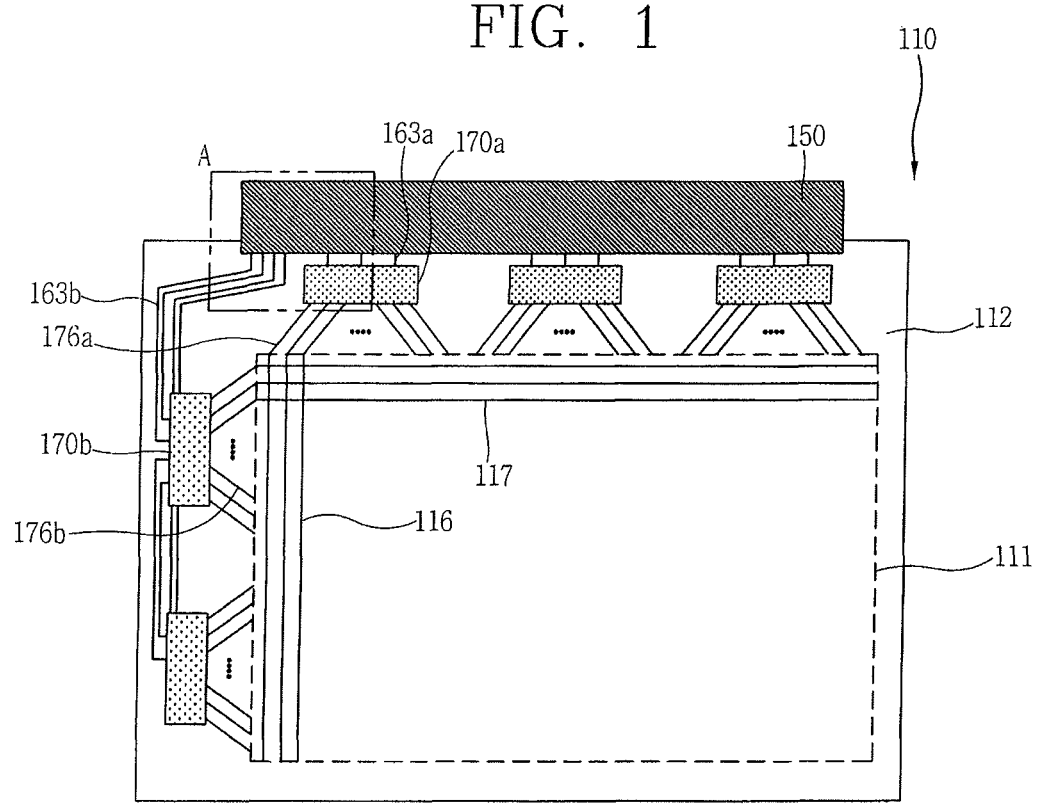
FIG. 1 is a planar view schematically showing a structure of an LOG type LCD device in accordance with one exemplary embodiment.

FIG. 1 is a planar view schematically showing a structure of an LOG type LCD device in accordance with one exemplary embodiment.

Figure 2:
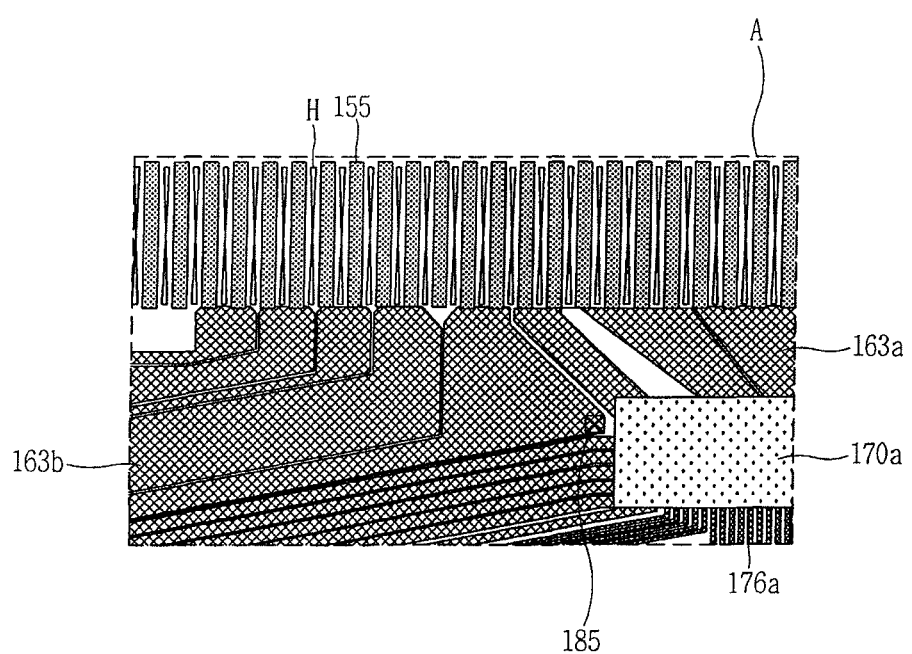
FIG. 2 is a partially enlarged planar view of a non-display region in the LOG type LCD device shown in FIG. 1.

Also, FIG. 2 is a partially enlarged planar view of a non-display region in the LOG type LCD device shown in FIG. 1, which shows an enlarged part A of the non-display region.

An LOG type LCD device according to one exemplary embodiment may include an LC panel divided into a display region and a non-display region and having pixels arranged on the display region in the form of a matrix, a backlight located below the LC panel to emit light, and a driving unit packaged (mounted) onto the non-display region of the LC panel to drive the pixels.

As shown in FIGS. 1 and 2, the LC panel may include a Thin Film Transistor (TFT) array substrate 110 and a color filter substrate (not shown) bonded to each other to face each other so as to maintain a uniform cell gap therebetween, and an LC layer located within the cell gap between the TFT array substrate 110 and the color filter substrate.

Although not shown, the color filter substrate may include a color filter provided with red, green and blue sub color filters, a black matrix to partition between the sub color filters and block light transmitted through the LC layer, and an overcoat layer formed on the color filter and the black matrix.

The display region of the array substrate 110 may include data lines 116 and gate lines 117 arranged vertically and horizontally to define pixel regions. A TFT (not shown) as a switching device may be formed at an intersection between the data line 116 and the gate line 117, namely, at a TFT region.

Although not shown, the TFT may include a gate electrode connected to the gate line 117, and a source electrode connected to the data line 116, and a drain electrode connected to the pixel electrode. The TFT may also include a gate insulating layer for insulation between the gate electrode and the source/drain electrodes, and an active pattern for forming a conductive channel between the source electrode and the drain electrode by a gate voltage supplied to the gate electrode. The TFT may further include a passivation layer for insulation between the source/drain electrodes and the pixel electrode.

Hereinafter, the backlight will be described in detail. For example, for an edge type backlight, a light source for emitting light is installed at one side of a light guide plate, and a reflection plate is installed at a rear surface of the light guide plate. The light emitted from the light source is incident onto a side surface of the light guide plate made of a transparent material. The reflection plate then reflects the light transmitted into the rear surface of the light guide plate toward optical sheets on the light guide plate, thereby reducing a light loss and improving uniformity.

The driving unit may include driving Integrated Circuits (ICs) 170a for applying a data signal to the data line and driving Integrated Circuits (ICs) 170b for applying a gate signal to the gate line 117 of the LC panel, respectively. The LCD devices may be divided, according to a method of packaging the driving ICs 170a and 170b onto the LC panel, into a Chip On Glass (COG) type, a Tape Carrier Packet (TCP) type, a Chip On Film (COF) type, and the like.

Among others, the COG type is to adhere the driving ICs 170a and 170b directly onto the array substrate 110 of the LCD device and connect an output electrode (not shown) of the driving ICs 170a and 170b directly to a line pad (not shown) of the array substrate 110. The COG type has a simple structure, and accordingly is advantageous in view of a simplified process and a low fabrication cost.

The array substrate 110 of the COG type LCD device may be divided into a display region 111 located within a dotted line for displaying an image thereon, and a non-display region 112 located outside the dotted line.

The plurality of data lines 116 and gate lines 117 may be formed within the display region 111. As aforementioned, the data lines 116 and the gate lines 117 intersect with each other to define pixel regions.

The non-display region 112 may include a data link line 176a and a gate link line 176b connected to the data line 116 and the gate line 117, respectively. A data pad (not shown) and a gate pad (not shown) may be connected to one end of the data link line 176a and one end of the gate link line 176b, respectively.

The data pad and the gate pad may be connected to a data driving IC 170a and a gate driving IC 170b packaged (mounted) onto the array substrate 110.

The data driving IC 170a and the gate driving IC 170b may be connected to an external printed circuit board (not shown) via a Flexible Printed Circuit (FPC) 150. The printed circuit board may include a timing controller and a power supply unit. A plurality of devices, such as the ICs, are formed on the board, so as to generate various types of control signals and driving voltages for driving the LCD device.

The timing controller may receive synchronization signals and image data applied from the exterior via the FPC 150, and transfers the synchronization signals and image data to the data driving IC 170a and the gate driving IC 170b. The power supply unit may supply a driving voltage to the data driving IC 170a and the gate driving IC 170b, respectively.

That is, the gate driving IC 170b may receive the control signal and the driving voltage from the timing controller and the power supply unit, and accordingly apply a gate signal to the plurality of gate lines 117 in a sequential manner. Also, the data driving IC 170a may receive the control signal and the image data form the timing controller and the driving voltage from the power supply unit, and accordingly apply a data signal for one horizontal line to the data line 116 with synchronizing with the gate signal of the gate line 117.

The COG type LCD device may achieve a simplification of the structure of the FPC 150 and the fabricating process by employing a Line On Glass (LOG) scheme in which signal lines of the driving ICs 170a and 170b are interconnected via LOGs 163a and 163b mounted onto the array substrate 110 so as to receive various control signals, driving voltages and the like. Here, for the sake of explanation, a signal line for connection between an FPC pad 155 within the FPC 150 and an input bumper (not shown) within the data driving IC 170a may be referred to as an Outer Lead Bonding (OLB) line 163a, and a signal line for connection between the FPC pad 155 and an input bumper (not shown) within the gate driving IC 170b may be referred to as an LOG 163b.

As such, the LOG type LCD device may not apply the control signal and the driving voltage directly to each of the driving ICs 170a and 170b via the FPC 150, but independently transfer the same via the OLB line 163a and the LOG 163b. Here, the present disclosure may not be limited to such cascade LOG type LCD device.

A reference numeral 185 denotes a jumping unit formed at the LOG 163b. The jumping unit may act as a double safety device for applying a signal in spite of breaking of a line. The jumping unit may be formed at a lower portion of an Anisotropic Conductive Film (ACF) area by being adjacent to the data driving IC 170a as close as possible. Also, an open hole H for exposing a surface of the array substrate 110 may be formed between the FPC pads 155.

Figure 3:
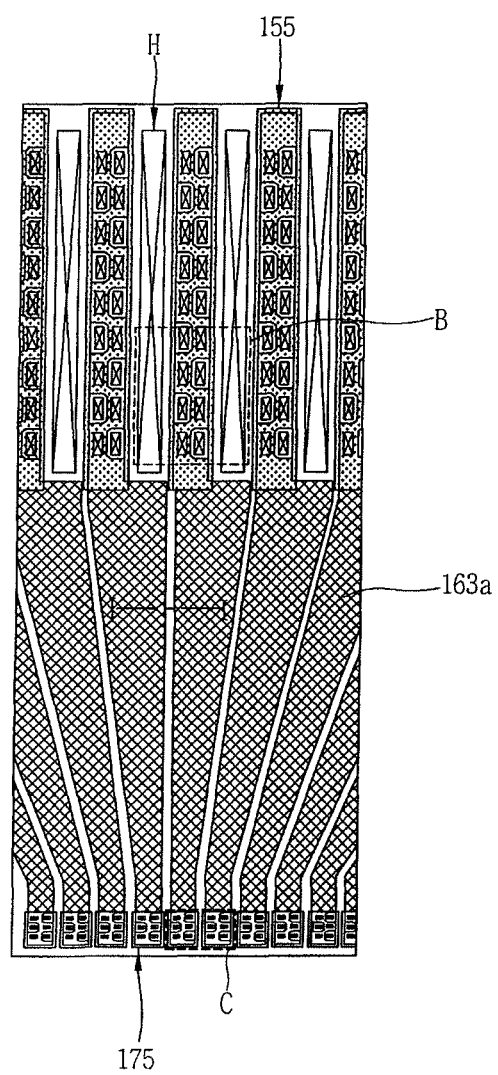
FIG. 3 is a partially enlarged planar view of an Outer Lead Bonding (OLB) part in the non-display region shown in FIG. 2.

FIG. 3 is an enlarged planar view of an Outer Lead Bonding (OLB) part in the non-display region shown in FIG. 2.

Figure 4A:
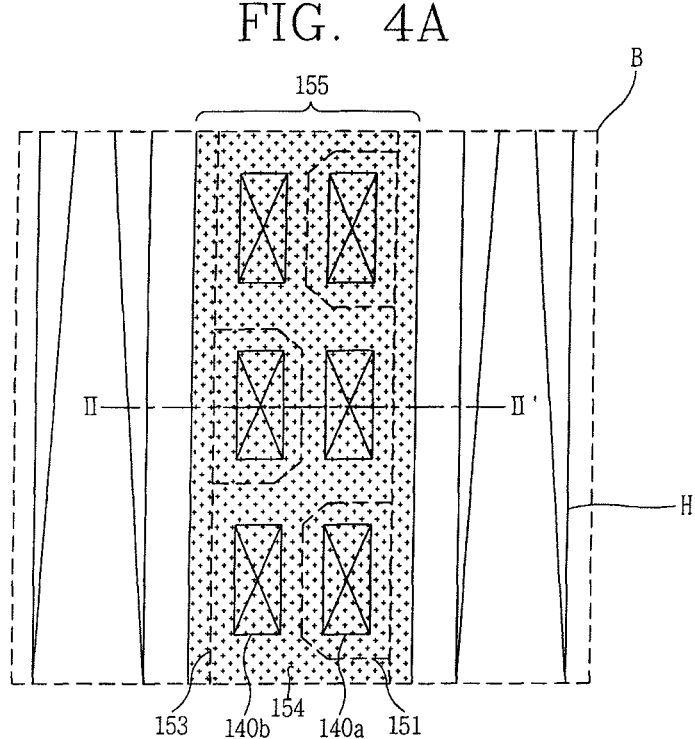
FIG. 4A is a partially enlarged planar view of Flexible Printed Circuit (FPC) pads shown in FIG. 3.

FIG. 4A is a partially enlarged planar view of Flexible Printed Circuit (FPC) pads shown in FIG. 3, which enlarges a part B of the FPC pads.

Figure 4B:
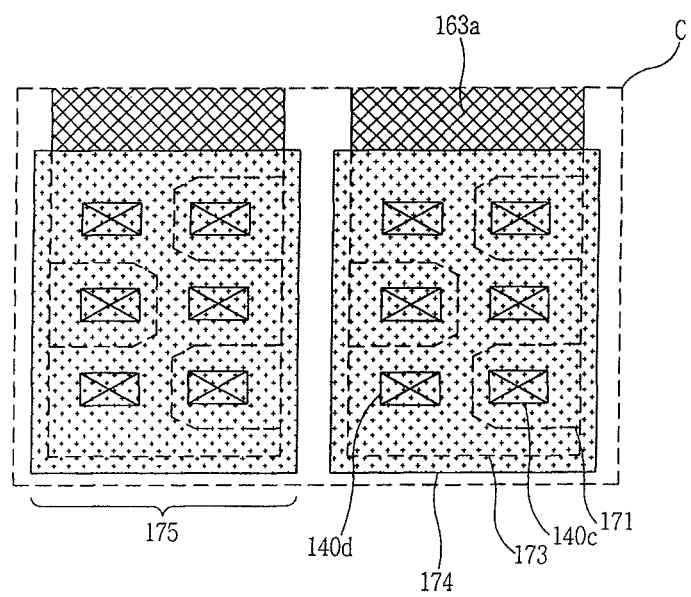
FIG. 4B is a partially enlarged planar view of an input bumper of a data driving IC shown in FIG. 3.

FIG. 4B is a partially enlarged planar view of an input bumpers of a data driving IC shown in FIG. 3, which enlarges a part C of the driving IC bumpers.

Figure 5:
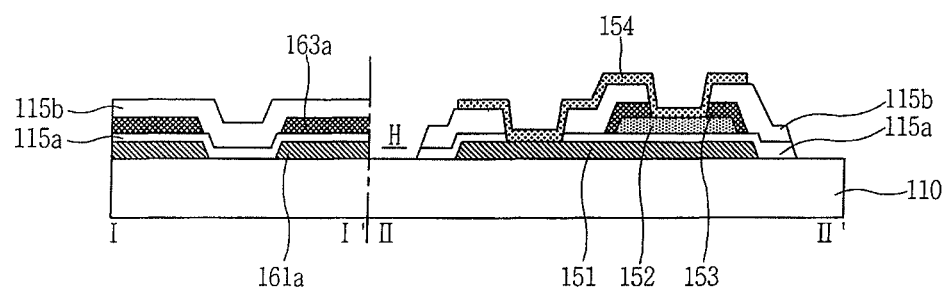
FIG. 5 is a view schematically showing a section of an array substrate taken along the lines I-I and II-II' in the LOG type LCD device shown in FIG. 3 and FIG. 4A.

FIG. 5 is a view schematically showing a section of an array substrate taken along the lines I-I and II-II' in the LOG type LCD device shown in FIG. 3 and FIG. 4A.

As aforementioned, a plurality of gate driving ICs 170b, which receive a plurality of control signals and image data and driving voltages from an external printed circuit board to sequentially apply driving signals of the TFTs to the plurality of gate lines, and a plurality of data driving ICs 170a, which receive the plurality of control signals and image data and the driving voltages to drive the plurality of data lines, are packaged onto the non-display region of the array substrate of the LOG type LCD device.

That is, the data driving ICs 170a and the gate driving ICs 170b are connected to the external printed circuit board via the FPC. The printed circuit board may include a timing controller and a power supply unit. A plurality of devices, such as the ICs, are formed on the board so as to generate various types of control signals and image data and driving voltages for driving the LCD device.

Referring to the drawings, the LOG type LCD device uses OLB lines 161a and 163a and the LOG as signal lines for applying the control signal, the image data and the driving voltage to each of the driving IC via the FPC. The OLB lines 161a and 163a and the LOG may be implemented as a dual line that a data conductive layer is deposited on a gate conductive layer, which allows for a decrease of a resistance of the line of the driving unit.

That is, for example, the OLB lines 161a and 163a may include a first OLB line 161a formed as a gate conductive layer and a second OLB line 163a formed on the first OLB line 161a as a data conductive layer. Also, although not shown, the LOG may include a first LOG formed as the gate conductive layer and a second LOG formed on the first LOG as the data conductive layer.

The OLB lines 161a and 163a and the LOG are more advantageous in view of driving the LCD device when the resistance is lower. Hence, the first OLB line 161a and the first LOG as main lines may be made of low-resistance metals, such as aluminum-based metals with the low resistance. However, most of such metals are vulnerable to corrosion, so they disadvantageously exhibit a high corrosion rate.

However, the exemplary embodiment of the present disclosure, for example, may employ a dual line that a molybdenum-based data conductive layer stronger to corrosion than aluminum is deposited on the aluminum-based gate conductive layer, and arrange the OLB line 161a and 163a and the LOG in parallel to each other. This may decrease the resistance of the driving unit lines and a signal applying function can be maintained even when one of conductive layers is broken due to corrosion or external scratch.

To this end, the OLB lines 161a and 163a of the dual line structure may be connected to each other via the FPC and contact holes 140a, 140b, 140c, 140d within an input bumper 175 of the data driving IC. Accordingly, even when the lower first OLB line 161a corrodes, the upper second OLB line 163a may allow for a signal input, resulting maintenance of the function of the driving unit line.

For example, the FPC pad 155 may include a lower electrode 151 formed on the array substrate 110 as a gate conductive layer, a gate insulating layer 115a on the lower electrode 151, an etch stopper 152 formed on the gate insulating layer 115a to overlap the lower electrode 151, an upper electrode 153 formed as a data conductive layer to shield the etch stopper 152, a passivation layer 115b on the upper electrode 153, and an FPC pad electrode 154 to electrically connect the lower electrode 151 to the upper electrode 153 via the first contact hole 140a and the second contact hole 140b formed at the passivation layer 115b.

An open hole H for exposing the surface of the array substrate 110 may be formed between the FPC pads 155.

The input bumper 175 of the data driving IC 170a may include a lower electrode 171 formed on the array substrate 110 as a gate conductive layer, a gate insulating layer 115a formed on the lower electrode 171, an etch stopper (not shown) formed on the gate insulating layer 115a to overlap the lower electrode 171, an upper electrode 173 formed as a data conductive layer to shield the etch stopper, a passivation layer 115b formed on the upper electrode 173, and an input bumper electrode 174 to electrically connect the lower electrode 171 to the upper electrode 173 via the third contact hole 140c and the fourth contact hole 140d formed at the passivation layer 115b.

When an active pattern or pixel electrode constructing the TFT is formed on the display region, the etch stopper 152 may be formed as a semiconductor layer or a transparent conductive layer constructing the active pattern or pixel electrode. The etch stoppers 152 may serve as anti-etching layers for preventing etching when forming the second contact hole 140b and the fourth contact hole 140d in a manner of penetrating the upper electrodes 153 and 173. Here, when the etch stopper 152 is formed as a transparent conductive layer, it may be possible to decrease a contact resistance between the FPC pad electrode 154 and the upper electrode 153 or between the input bumper electrode 174 and the upper electrode 173.

The FPC pad electrode 154 and the input bumper electrode 174 may be formed of a transparent conductive material, such as Indium Tin Oxide (ITO) or Indium Zinc Oxide (IZO).

The contact holes 140a, 140b may be arranged, in a zigzag manner, at right and left sides within the FPC pad 155. Similarly, the contact holes 140c, 140d may be arranged in a zigzag manner, at right and left sides within the input bumper 175. Accordingly, it is possible to effectively handle the breaking of the upper electrodes 153 and 173 or the lower electrodes 151 and 171. For example, when the first contact hole 140a and the third contact hole 140c are arranged at the left side, the second contact hole 140b and the fourth contact hole 140d are arranged at the right side. On the contrary, when the first contact hole 140a and the third contact hole 140c are arranged at the right side, the second contact hole 140b and the fourth contact hole 140d are arranged at the left side. The contact holes 140a, 140b, 140c, 140d may be alternatively arranged at the right and left sides with respect to the corresponding contact holes 140a, 140b, 140c, 140d. However, the present disclosure may not be limited to this structure.

Although not shown, the LOG of the dual line structure may also be configured such that the first LOG and the second LOG are connected to each other via the FPC pad 155 and contact holes within the input bumper of the gate driving IC. Accordingly, even when the lower first LOG corrodes, the upper second LOG may allow for a signal input.

In the LOG type LCD device according to the exemplary embodiment, a salty water spraying test was performed in the worst condition for testing corrosion, and then it was noticed that a screen of the LCD device normally works.

For example, upon employing a dual line that the molybdenum-based data conductive layer was deposited on the aluminum-based gate conductive layer, after spraying salty water containing 1% NaCl onto cells, when the cells were kept under a condition of a room temperature and a condition of high temperature and high humidity of 60° C. and 90%, any change in a corrosion level after 24 hours was exhibited from the cells.

Also, when handling a liquid crystal module during a fabricating process, the module was fabricated after staining artificial sweat (0.5% NaCl) and an operation test for the module was performed for 240 hours under a condition of 60° C. and 90%, no change in reliability was seen.

Hereinafter, description will be given in detail of a method for fabricating an LOG type LCD device in accordance with the preferred embodiment with reference to the accompanying drawings.

FIGS. 6A to 6E are planar views sequentially showing a process of fabricating the FPC pad shown in FIG. 4A.

FIGS. 7A to 7E are planar views sequentially showing a process of fabricating the input bumper of the data driving IC shown in FIG. 4B. An input bumper of the gate driving IC may be fabricated through the same fabrication process.

FIGS. 8A to 8F are sectional views sequentially showing a process of fabricating the array substrate shown in FIG. 5, which shows a process of fabricating the array substrate on which TFTs are fabricated on the display region.

FIGS. 8A to 8F exemplarily shows a method for fabricating a Fringe Field Switching (FFS) type LCD device in which a fringe field formed between a pixel electrode and a common electrode penetrates through a slit and accordingly drives liquid crystal molecules located on a pixel region and the common electrode so as to represent an image. Here, the present disclosure may not be limited to the driving mode of the LCD device.

Figure 6A:
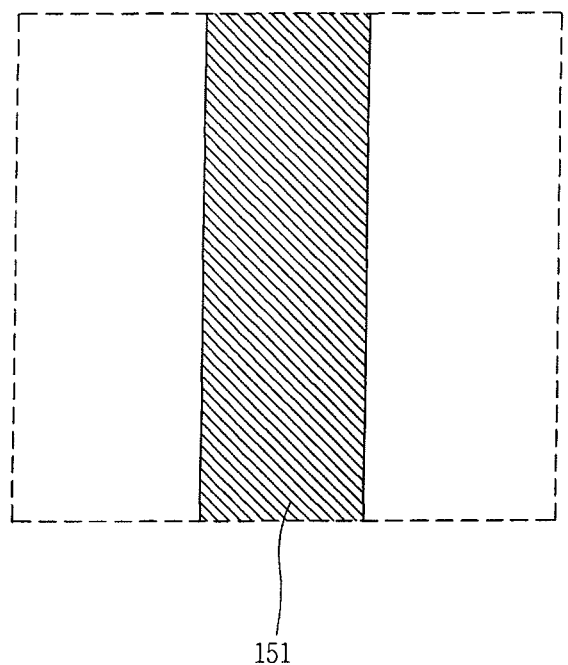
FIGS. 6A to 6E are planar views sequentially showing a process of fabricating the FPC pad in FIG. 4A.
Figure 7A:
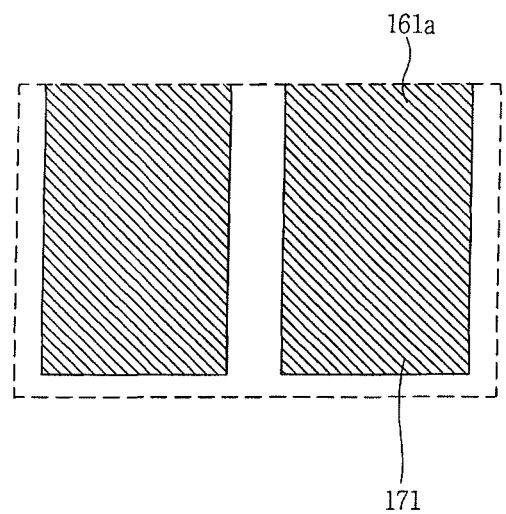
FIGS. 7A to 7E are planar views sequentially showing a process of fabricating the input bumper of the data driving IC shown in FIG. 4B.
Figure 8A:
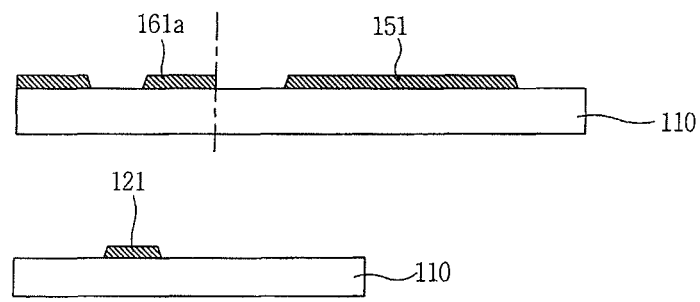
FIGS. 8A to 8F are sectional views sequentially showing a process of fabricating an array substrate shown in FIG. 5.

As shown in FIGS. 6A, 7A and 8A, a gate electrode 121 and a gate line (not shown) are formed on a display region of an array substrate 110, which is made of a transparent insulating material. A lower electrode 151 of an FPC pad, a lower electrode 171 of an input bumper, a first OLB line 161a and a first LOG (not shown) are formed on a driving unit of the array substrate 110.

The gate electrode 121, the gate line, the lower electrode 151 of the FPC pad, the lower electrode 171 of the input bumper, the first OLB line 161a and the first LOG are formed by depositing a first conductive layer as a gate conductive layer on an entire surface of the array substrate 110 and selectively patterning the first conductive layer through a photolithography process (i.e., the first mask process).

The first conductive layer may be formed of a low-resistance conductive material, such as an aluminum-based material, for example, aluminum (Al) alloy or the like. Also, the first conductive layer may be formed to have a multi-layered structure that more than two types of the low-resistance conductive materials are deposited.

The first OLB line 161a extends toward the FPC to be connected to the lower electrode 151 of the FPC pad, and extends toward the data driving IC to be connected to the lower electrode 171 of the input bumper.

Although not shown, the first LOG extends toward the FPC to be connected to the lower electrode 151 of the FPC pad and extends toward the gate driving IC to be connected to the lower electrode of the input bumper.

Figure 8B:
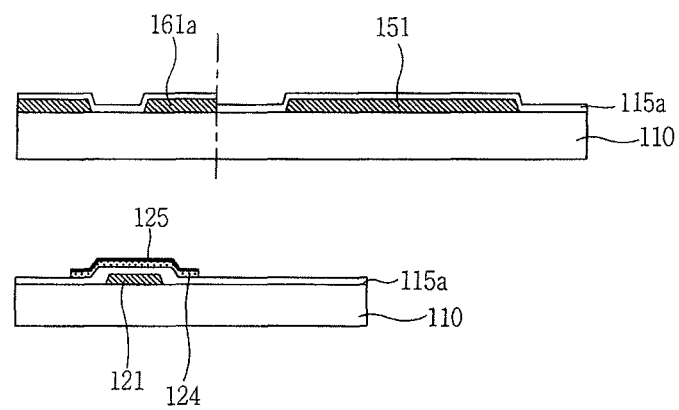

Next, as shown in FIG. 8B, a gate insulating layer 115a, an amorphous silicon thin film and n+ amorphous silicon thin film are formed on the entire surface of the array substrate 110 which includes thereon the gate electrode 121, the gate line, the lower electrode 151 of the FPC pad, and the lower electrode 171 of the input bumper, the first OLB line 171a and the first LOG.

Afterwards, a photolithography process (i.e., the second mask process) is performed to selectively remove the amorphous silicon thin film and the n+ amorphous silicon thin film, thereby forming an active pattern 124, which is formed of the amorphous silicon thin film, on a TFT region of the array substrate 110.

On the active pattern 124 is formed an n+ amorphous silicon thin film pattern 125, which is patterned into actually the same shape as the active pattern 124.

As one example, etch stoppers, which include the amorphous silicon thin film and the n+ amorphous silicon thin film, may be formed on the lower electrode 151 of the FPC pad and the lower electrode 171 of the input bumper.

Figure 6B:
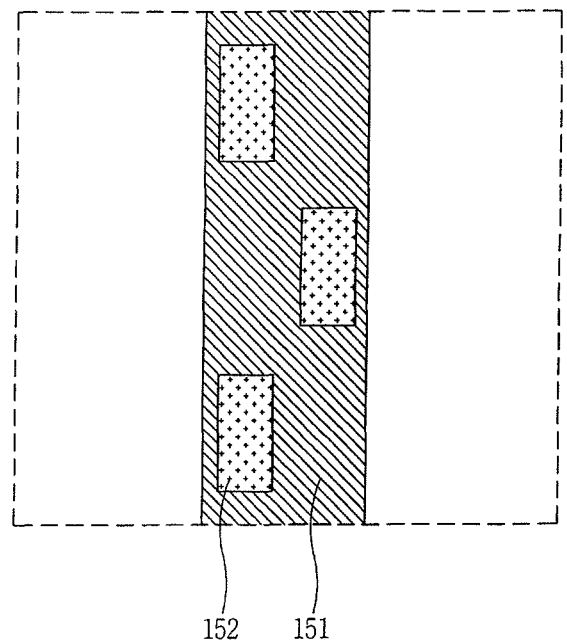
Figure 7B:
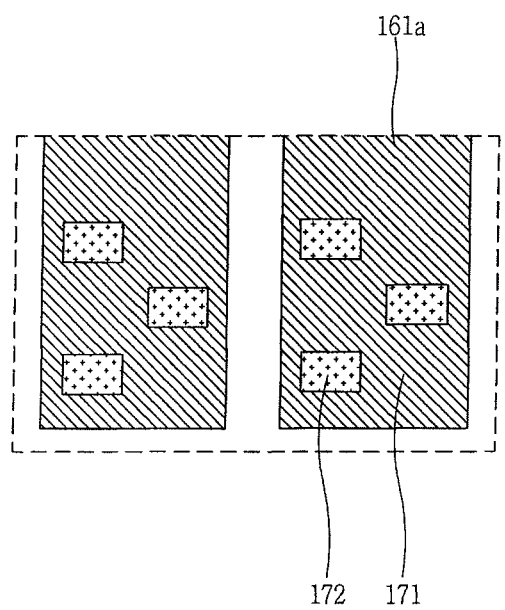
Figure 8C:
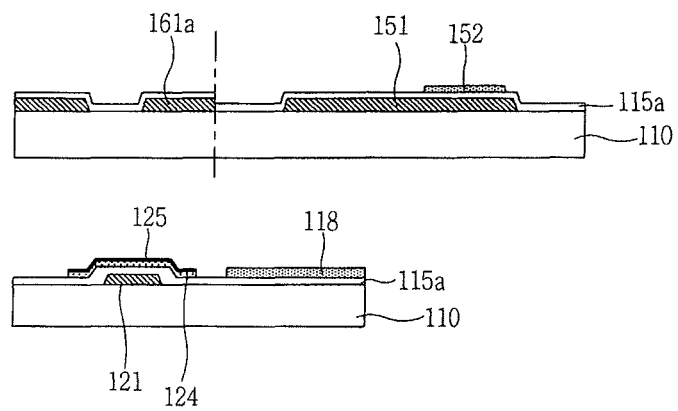

As another example, as shown in FIGS. 6B, 7B and 8C, after forming a second conductive layer on the entire surface of the array substrate 110 having the active pattern 124 and the n+ amorphous silicon thin film pattern 125, the second conductive layer is selectively removed through a photolithography process (i.e., the third mask process). Accordingly, a pixel electrode 118 formed of the second conductive layer may be formed on the pixel area of the array substrate 110 and the etch stoppers 152 and 172 formed of the second conductive layer may be formed on the lower electrode 151 of the FPC pad and the lower electrode 171 of the input bumper.

The second conductive layer may be a transparent conductive layer and made of a transparent conductive material such as ITO or IZO.

The etch stoppers 152 and 172 may be formed, in a zigzag manner, at right and left sides on the lower electrode 151 of the FPC pad and the lower electrode 171 of the input bumper. Here, the present disclosure may not be limited to the structure.

The etch stoppers 152 and 172 may be formed on the lower electrode 151 of the FPC pad and the lower electrode 171 of the input bumper in an overlapping manner.

Figure 6C:
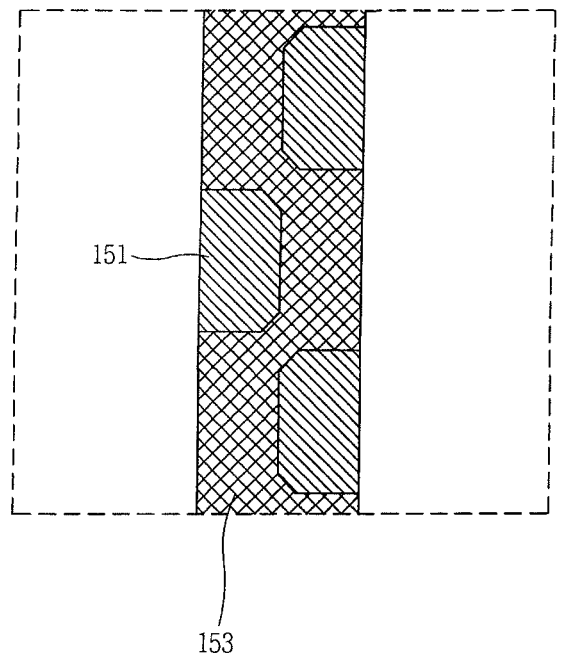
Figure 7C:
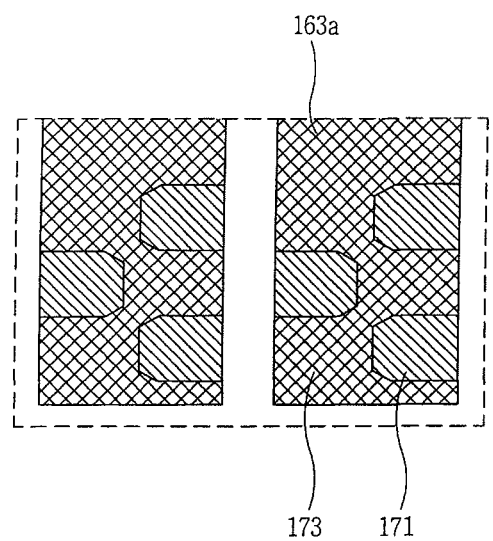
Figure 8D:
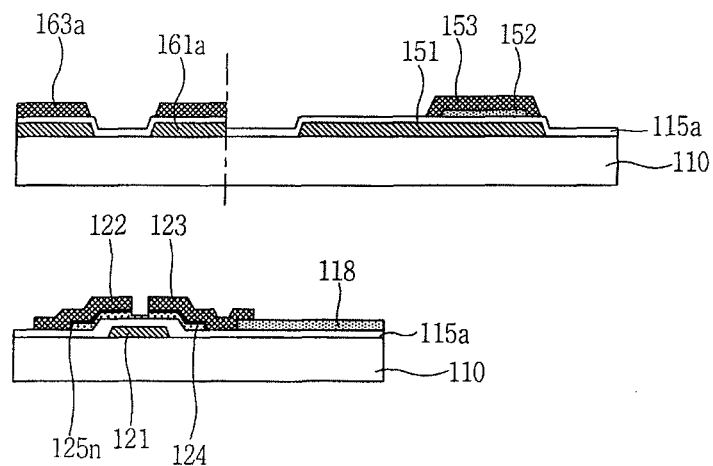

As shown in FIGS. 6C, 7C and 8D, a third conductive layer as a data conductive layer is formed on the entire surface of the array substrate 110 which has thereon the pixel electrode 118 and the etch stoppers 152 and 172.

Afterwards, a photolithography process (i.e., the fourth mask process) is performed to selectively remove the n+ amorphous silicon thin film and the third conductive layer, thereby forming a source electrode 122 and the drain electrode 123 formed of the third conductive layer on the active pattern 124.

Through the fourth mask process, a data line (not shown) formed of the third conductive layer is formed on a data line area of the array substrate 110, and simultaneously the upper electrode 153 of the FPC pad, and the upper electrode 173 of the input bumper, the second OLB line 163a and the second LOG (not shown), which are formed of the third conductive layer, are formed on the driving unit of the array substrate 110.

The upper electrode 153 of the FPC pad and the upper electrode 173 of the input bumper may be formed so as to expose right and left sides of the lower electrode 151 of the FPC pad and the lower electrode 171 of the input bumper located therebelow in a zigzag manner. The second OLB line 163a and the second LOG may be formed actually in the same shape as the first OLB line 161a and the first LOG located therebelow.

The upper electrode 153 of the FPC pad and the upper electrode 173 of the input bumper may be formed to shield the lower etch stoppers 152 and 172, respectively.

The third conductive layer may be formed of a conductive material, such as a molybdenum-based material consisting of molybdenum (Mo), molybdenum (Mo) alloy or the like, which is stronger to corrosion than the aluminum-based conductive material.

The second OLB line 163a extends toward the FPC to be connected to the lower electrode 153 of the FPC pad, and extends toward the data driving IC to be connected to the lower electrode 173 of the input bumper.

Although not shown, the second LOG extends toward the FPC to be connected to the lower electrode 153 of the FPC pad and extends toward the gate driving IC to be connected to the lower electrode of the input bumper.

On the active pattern 124 is formed an Ohmic-contact layer 125n, which is formed of the n+ amorphous silicon thin film and allows an Ohmic-contact between source/drain regions of the active pattern 124 and the source/drain electrodes 122 and 123.

Figure 6D:
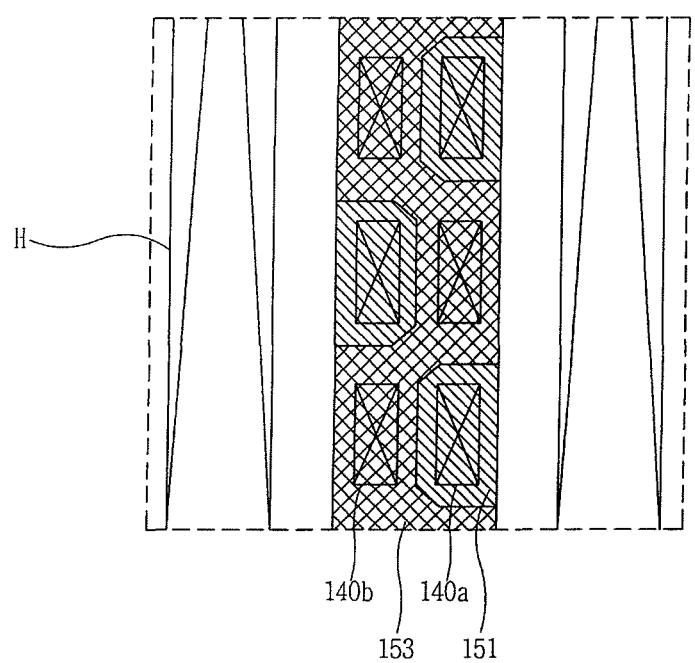
Figure 7D:
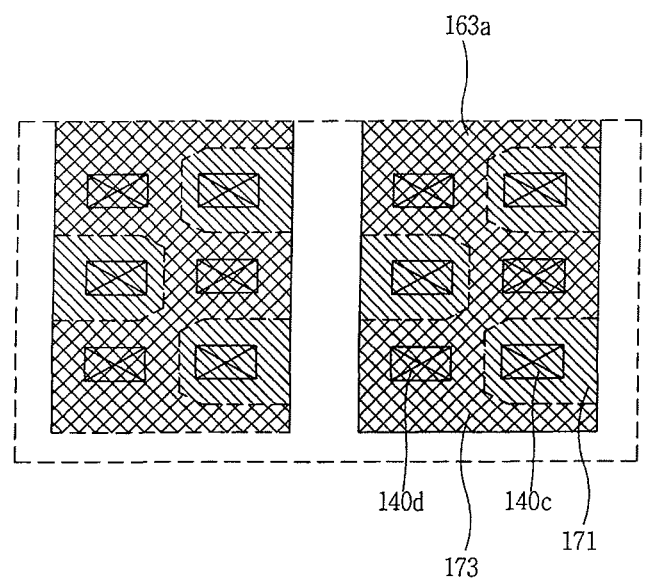
Figure 8E:
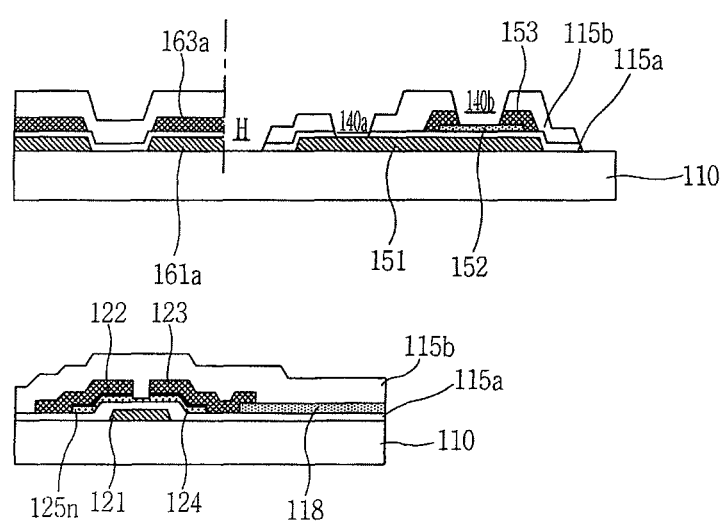

Next, as shown in FIGS. 6D, 7D and 8E, a passivation layer 115b is formed on the entire surface of the array substrate 110, which includes thereon the source/drain electrodes 122 and 123, the data line, the upper electrode 153 of the FPC pad, and the upper electrode 173 of the input bumper, the second OLB line 163a and the second LOG.

A photolithography process (i.e., the fifth mask process) is performed to selectively remove the gate insulating layer 115a, the etch stoppers 152 and 172 and the passivation layer 115b. Accordingly, a first contact hole 140a, a second contact hole 140b, a third contact hole 140c and a fourth contact hole 140d are formed on the driving unit of the array substrate 110 so as to partially expose the lower electrode 151 and the etch stopper 152 of the FPC pad, and the lower electrode 171 and the etch stopper 172 of the input bumper, respectively. Here, the second contact hole 140b and the fourth contact hole 140d may expose side surfaces of the upper electrode 153 of the FPC pad and the upper electrode 173 of the input bumper as well as the surfaces of the etch stoppers 152 and 172.

Also, an open hole H for exposing the surface of the array substrate 110 may be formed between the FPC pads through the fifth mask process.

The contact holes 140a, 140b may be arranged at right and left sides within the FPC pad 155 in a zigzag manner. Similarly, the contact holes 140c, 140d may be arranged in a zigzag manner, at right and left sides within the input bumper 175. Accordingly, it is possible to effectively handle the breaking of the upper electrode 153 of the FPC pad and the upper electrode 173 of the input bumper or the lower electrode 151 of the FPC pad and the lower electrode 171 of the input bumper. For example, when the first contact hole 140a and the third contact hole 140c are arranged at the left side, the second contact hole 140b and the fourth contact hole 140d are arranged at the right side. On the contrary, when the first contact hole 140a and the third contact hole 140c are arranged at the right side, the second contact hole 140b and the fourth contact hole 140d are arranged at the left side. The contact holes 140a, 140b, 140c, 140d may be arranged at the right and left sides in a zigzag manner with respect to the corresponding contact holes 140a, 140b, 140c, 140d. However, the present disclosure may not be limited to this structure.

Figure 6E:
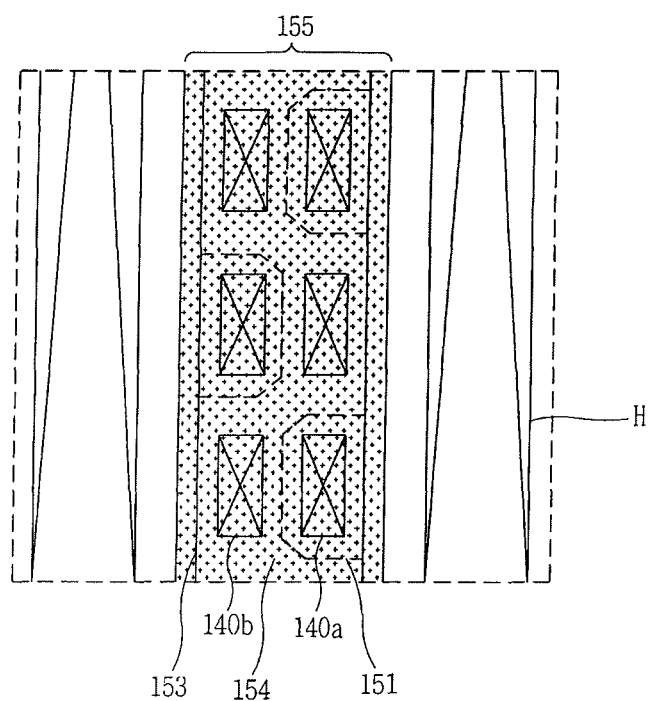
Figure 7E:
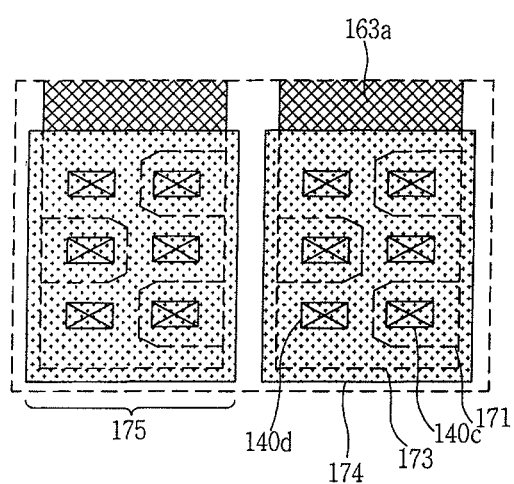
Figure 8F:
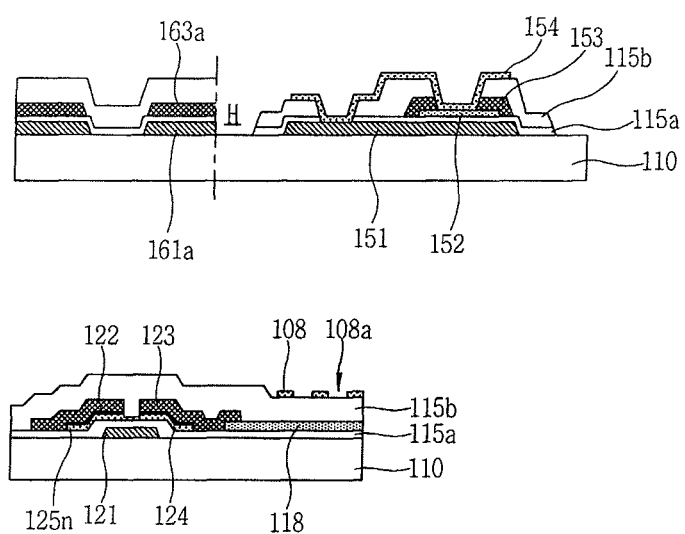

As shown in FIGS. 6E, 7E and 8F, after forming a fourth conductive layer made of the transparent conductive material on the front surface of the array substrate 110 having the passivation layer 115b, the fourth conductive layer is selectively patterned using a photolithography process (i.e., the sixth mask process), thereby forming a common electrode 108 made of the fourth conductive layer on the display region of the array substrate 110. Here, the common electrode 108 may be formed to have a plurality of slits 108a within the pixel regions.

Through the sixth mask process for selectively patterning the fourth conductive layer, an FPC pad electrode 154, which is electrically connected to the lower electrode 151 and the upper electrode 153 of the FPC pad through the first contact hole 140a and the second contact hole 140b, is formed, and also an input bumper electrode 174, which is electrically connected to the lower electrode 171 and the upper electrode 173 of the input bumper via the third contact hole 140c and the fourth contact hole 140d, is formed.

The fourth conductive layer may be a transparent conductive layer and made of a transparent conductive material such as ITO or IZO.

The array substrate having such configuration is then bonded to a color filter substrate in a facing manner by a sealant formed on an outer periphery of the display region. Here, the color filter substrate may include a black matrix for preventing light from being leaked into the TFT, the gate line and the data line, and color filters for implementing red, green and blue colors.

The bonding of the color filter substrate and the array substrate may be achieved by a bonding key formed at the color filter substrate or the array substrate.

The present disclosure may be applied to not only the LCD device but also other display devices fabricated using TFTs, for example, an organic electroluminescence display device that an Organic Light Emitting Diodes (OLEDs) are connected to driving transistors.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A Line On Glass (LOG) type liquid crystal display device comprising:
   a liquid crystal panel divided into a display region and a non-display region, and having a plurality of data lines and gate lines intersecting with each other on the display region;
   a flexible printed circuit (FPC) configured to electrically connect a printed circuit board to the liquid crystal panel;
   a plurality of gate driving integrated circuits (ICs) and data driving integrated circuits being packaged onto the non-display region;
   a plurality of outer lead bonding (OLB) lines and line on glasses (LOGs) employed for connection between the flexible printed circuit and the data driving integrated circuits and between the flexible printed circuit and the gate driving integrated circuits, respectively, and implemented as a dual line that a data conductive layer is deposited on a gate conductive layer; and
   a plurality of flexible printed circuit pads within the flexible printed circuit, respectively, and configured to electrically connect the gate conductive layer and the data conductive layer of the outer lead bonding line or the line on glass, wherein each of the flexible printed circuit pads comprises:
   a lower electrode of a flexible printed circuit pad comprised as the gate conductive layer on a first substrate;
   a gate insulating layer on the first substrate having the lower electrode of the flexible printed circuit pad;
   a first etch stopper on the gate insulating layer to overlap the lower electrode of the flexible printed circuit pad;
   an upper electrode of a flexible printed circuit pad comprised as the data conductive layer to shield the first etch stopper;
   a passivation layer on the first substrate having the upper electrode of the flexible printed circuit pad; and
   a flexible printed circuit and electrode electrically connected to the lower electrode and the upper electrode of the flexible printed circuit pad via a plurality of first contact holes and second contact holes at the passivation layer.

2. The device according to claim 1, further comprising a plurality of input bumpers in the data driving integrated circuits and the gate driving integrated circuits, respectively, and configured to electrically connect the gate conductive layer and the data conductive layer of the outer lead bonding line or the line on glass, wherein each of the input bumpers comprises:
   a lower electrode of an input bumper comprised as the gate conductive layer on the first substrate;
   the gate insulating layer on the lower electrode of the input bumper;
   a second etch stopper on the gate insulating layer to overlap the lower electrode of the input bumper;
   an upper electrode of an input bumper comprised as the data conductive layer to shield the second etch stopper;
   the passivation layer on the upper electrode of the input bumper; and
   an input bumper electrode electrically connected to the lower electrode and the upper electrode of the input bumper via a plurality of third contact holes and fourth contact holes at the passivation layer.

3. The device according to claim 1, wherein the outer lead bonding lines comprise a first outer lead bonding line comprised as the gate conductive layer and a second outer lead bonding line comprised as the gate conductive layer on the first outer lead bonding line, and the line on glasses comprise a first line on glass comprised as the gate conductive layer and a second line on glass comprised as the data conductive layer on the first line on glass.

4. The device according to claim 3, wherein the first outer lead bonding line and the second outer lead bonding line are electrically connected to each other via a first contact hole and a second contact hole within a flexible printed circuit pad, and via a third contact hole and a fourth contact hole within an input bumper of the data driving integrated circuit.

5. The device according to claim 4, wherein the first contact hole, the second contact hole, the third contact hole and the fourth contact hole are arranged in a zigzag manner at right and left sides on the flexible printed circuit pad or the input bumper.

6. The device according to claim 5, wherein when the first contact hole and the third contact hole are arranged at a left side, the second contact hole and the fourth contact hole are arranged at a right side, wherein when the first contact hole and the third contact hole are arranged at a right side, the second contact hole and the fourth contact hole are arranged at a left side.

7. The device according to claim 6, wherein the gate conductive layer is made of an aluminum-based conductive material consisting of aluminum or aluminum alloy, and the data conductive layer is made of a molybdenum-based conductive material consisting of molybdenum or molybdenum alloy.

8. The device according to claim 3, wherein the first line on glass and the second line on glass are electrically connected to each other via a first contact hole and a second contact hole within a flexible printed circuit pad, and via a third contact hole and a fourth contact hole within an input bumper of the gate driving integrated circuit.

9. A method for fabricating a Line On Glass (LOG) type liquid crystal display device, the method comprising:
preparing a first substrate divided into a display region and a non-display region;
forming a gate electrode and a gate line on the display region of the first substrate, and forming a lower electrode of a flexible printed circuit pad, a lower electrode of an input bumper, a first outer lead bonding (OLB) line and a first line on glass (LOG) on the non-display region of the first substrate;
forming a gate insulating layer on the first substrate having thereon the gate electrode, the gate line, the lower electrode of the flexible printed circuit pad, the lower electrode of the input bumper, the first outer lead bonding line and the first line on glass;
forming an active pattern on the gate electrode having the gate insulating layer thereon;
forming a pixel electrode on a pixel region of the first substrate and forming a first etch stopper and a second etch stopper on the lower electrode of the flexible printed circuit pad and the lower electrode of the input bumper, respectively; and
forming a source electrode, a drain electrode and a data line on the display region of the first substrate having the active pattern thereon, and forming an upper electrode of the flexible printed circuit pad, an upper electrode of the input bumper, a second outer lead bonding line and a second line on glass on the lower electrode of the flexible printed circuit pad, the lower electrode of the input bumper, the first outer lead bonding line and the first line on glass, respectively.

10. The method according to claim 9, further comprising:
forming a passivation layer on the first substrate having thereon the source electrode, the drain electrode, the data line, the upper electrode of the flexible printed circuit pad, the upper electrode of the input bumper, the second outer lead bonding line and the second line on glass;
selectively removing the gate insulating layer, the upper electrode of the flexible printed circuit pad, the upper electrode of the input bumper and the passivation layer to form a first contact hole, a second contact hole, a third contact hole and a fourth contact hole at the non-display region of the first substrate so as to partially expose the lower electrode of the flexible printed circuit pad, the first etch stopper, the lower electrode of the input bumper and the second etch stopper, respectively;
forming a common electrode having a plurality of slits within the pixel region of the display region of the first substrate, forming a flexible printed circuit pad electrode on the non-display region of the first substrate to be electrically connected to the lower electrode and the upper electrode of the flexible printed circuit pad via the first contact hole and the second contact hole, respectively, and forming an input bumper electrode to be electrically connected to the lower electrode and the upper electrode of the input bumper via the third contact hole and the fourth contact hole, respectively; and
bonding the first substrate to a second substrate.

11. The method according to claim 10, wherein the first outer lead bonding line extends toward the flexible printed circuit to be connected to the lower electrode of the flexible printed circuit pad and simultaneously extends toward a data driving integrated circuit to be connected to the lower electrode of the input bumper, wherein the first line on glass extends toward the flexible printed circuit to be connected to the lower electrode of the flexible printed circuit pad and simultaneously extends toward a gate driving integrated circuit to be connected to the lower electrode of the input bumper.

12. The method according to claim 10, wherein the first and second etch stoppers are formed in a zigzag manner at right and left sides on the lower electrode of the flexible printed circuit pad and the lower electrode of the input bumper.

13. The method according to claim 12, wherein the upper electrode of the flexible printed circuit pad and the upper electrode of the input bumper are formed so as to expose in a zigzag manner right and left sides of the lower electrode of the flexible printed circuit pad and the lower electrode of the input bumper located therebelow, respectively.

14. The method according to claim 12, wherein the upper electrode of the flexible printed circuit pad and the upper electrode of the input bumper are formed to cover the first etch stopper and the second etch stopper located therebelow, respectively.

15. The method according to claim 10, wherein the second outer lead bonding line extends toward the flexible printed circuit to be connected to the upper electrode of the flexible printed circuit pad and simultaneously extends toward a data driving integrated circuit to be connected to the upper electrode of the input bumper, wherein the second line on glass extends toward the flexible printed circuit to be connected to the upper electrode of the flexible printed circuit pad and simultaneously extends toward a gate driving integrated circuit to be connected to the upper electrode of the input bumper.

16. The method according to claim 10, wherein the second contact hole and the fourth contact hole expose side surfaces of the upper electrode of the flexible printed circuit pad and the upper electrode of the input bumper, respectively, as well as surfaces of the first and second etch stoppers.

17. The method according to claim 10, wherein the first contact hole, the second contact hole, the third contact hole and the fourth contact hole are arranged in a zigzag manner within the flexible printed circuit or the input bumper.

18. The method according to claim 10, wherein the lower electrode of the flexible printed circuit pad, the lower electrode of the input bumper, the first outer lead bonding line and the first line on glass are formed of an aluminum-based conductive material consisting of aluminum or aluminum alloy.

19. The method according to claim 10, wherein the pixel electrode, the common electrode, the first and second etch stoppers, the flexible printed circuit pad electrode and the input bumper electrode are made of a transparent conductive material including Indium Tim Oxide (ITO) or Indium Zinc Oxide (IZO).

20. The method according to claim 10, wherein the source electrode, the drain electrode, the upper electrode of the flexible printed circuit pad, the upper electrode of the input bumper, the second outer lead bonding line and a second line on glass are made of a molybdenum-based conductive material consisting of molybdenum or molybdenum alloy.

* * * * *